United States Patent Office 3,114,205
Patented Dec. 17, 1963

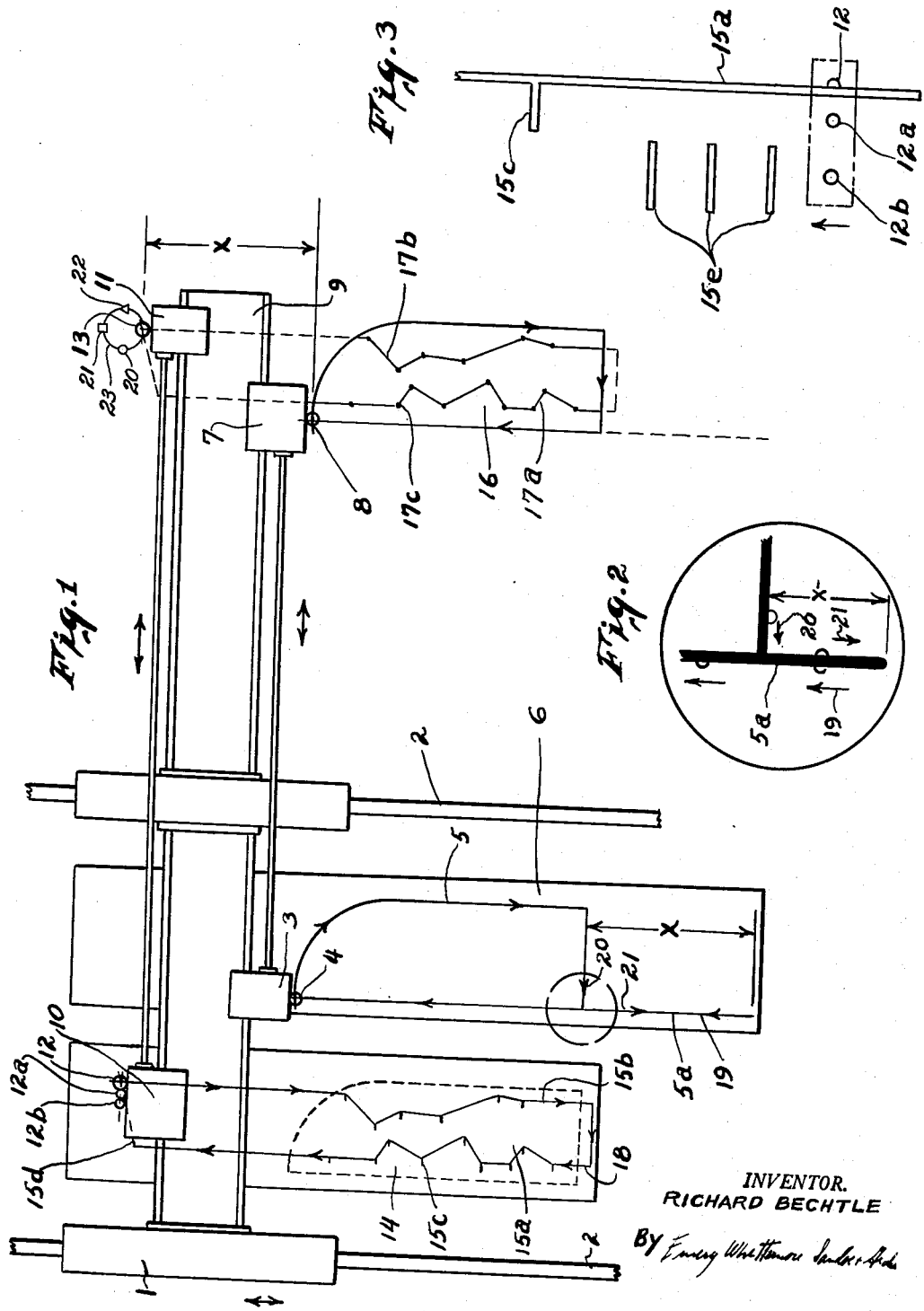
Dec. 17, 1963
R. BECHTLE
3,114,205
APPARATUS FOR SIMULTANEOUS FLAME CUTTING AND MARKING OF PROFILED SHEET METAL
Filed March 15, 1960
INVENTOR.
RICHARD BECHTLE
ATTORNEYS

3,114,205
APPARATUS FOR SIMULTANEOUS FLAME CUTTING AND MARKING OF PROFILED SHEET METAL
Richard Bechtle, Niederhochstadt, Taunus, Germany, assignor to American Messer Corporation, New York, N.Y., a corporation of New York
Filed Mar. 15, 1960, Ser. No. 15,160
3 Claims. (Cl. 33—23)

This invention relates to apparatus for simultaneously cutting sheet metal and marking the profiled sheet metal and, more particularly, to such apparatus in which the cutting and marking are independently controlled by control drawings.

Apparatus for cutting sheet metal, such as steel plates, to an outline profile by a cutting torch which is caused to traverse the sheet metal in predetermined path corresponding to a control drawing, are known to the art. In many applications, it is necessary to mark the profiled sheet metal with indicia to locate the position of bolt holes, fish plates, ribs, bulkheads, etc. A specific example may be selected from ship construction. In such construction, plates are profiled and shaped. Prior to shaping, the plates are marked with indicia to show the location of mating members such as bulkheads, etc.

The art has suggested the locating indicia be marked by the cutting torch assembly. For example, in one device known to the art, an oxygen lance is arranged to swivel around the cutting torch and is controllably positioned with respect to the torch as to be in the plane normal to the direction travel of the torch. The surface of the profiled material may be marked by briefly opening the oxygen jet of the lance. Unfortunately, this device is suitable only for producing markings at the cutting edge and will not be suitable for locating marks at other positions on the profiled material.

The art has also suggested that a special marking tool such as an electromagnetically operated prick punch be installed adjacent the cutting torch at a fixed distance therefrom. Since the marks can thus be made only at the fixed distance, such arrangement is unsuitable for practical operation.

Therefore, the art has been forced to resort to marking the locations with indicia in a separate operation, subsequent to cutting of the sheet metal. This marking is usually done by hand, thus entailing considerable extra labor expense in the marking process in addition to the added material handling expense.

It is therefore the primary object of this invention to provide apparatus for simultaneous cutting of sheet material to an outline profile and marking of the sheet material with indicia in response to control drawings.

In accordance with this object, there is provided, in a preferred embodiment of this invention, a cross carriage flame cutting apparatus which will drive the cutting torch over a predetermined path in cutting relationship to sheet metal stock in response to control directions introduced by a template, a punch card reader, a tape reader, or a photoelectric tracer of a control drawing.

To enable the cutting torch to reach all positions on the sheet material with simple directional control, the cutting torch is controllably movable longitudinally and transversely of the material. Coupled to the cutting torch and movable at a fixed distance therefrom in the longitudinal direction is a marking unit. The marking unit is independently movable transversely of the material in response to a control mechanism such as a control drawing scanned by a photoelectric cell.

The marking unit may thus be directed to desired positions on the material and actuated to impress indicia at said desired locations.

The marking unit may comprise a plurality of indicia selectable by control signals derived from the control drawing.

When control drawings are employed, a reduced scale or full scale may be used.

Other objects and advantages of this invention will be pointed out hereinafter by reference to the following description taken in conjunction with the accompanying drawings of which:

FIGURE 1 is a top plan view of the apparatus in accordance with this invention.

FIGURE 2 is a plan view, to an enlarged scale, of a portion of the control drawing shown in FIGURE 1, and FIGURE 3 is a plan view of a control drawing used for indicia symbol control.

In FIGURE 1, there is shown the apparatus for simultaneous cutting and marking of sheet metal, such as steel plates, which comprises a longitudinally movable lower carriage 1, longitudinally movable along rails 2. Mounted on the lower carriage 1 is a transversely movable upper carriage 3. The carriage carries a photoelectric steering device 4 in scanning relationship to the cutting path 5 imprinted on drawing 6. Mechanically coupled to the upper carriage 3 is the cutting torch carriage 7 upon which a cutting torch 8 is fixedly mounted. It will be noted that the mechanical coupling may be replaced by a servo coupling. The cutting torch carriage 7 travels on bracket 9 extending from lower carriage 1.

In accordance with scan of the photoelectric cell 4, the cutting torch carriage is driven both lonigtudinally and transversely to reproduce the outline path 5 on the drawing 6 in movement of the cutting torch 8 to cut out from a sheet material a plate of the requisite outline dimensions.

At the rear of the transverse carriage there is provided an additional sensor carrier 10 mechanically coupled to an indicia carrier 11. A photoelectric scanner or steering device 12 is mounted on the carriage 10 and carriage 11 carries an indicia marking tool 13 such as an electromagnetically operated prick punch or an ink marker or brush.

In manner known to the art, the steering control afforded by the photoelectric cell 4 is most advantageously afforded by mounting the associated light source for rotation about the photocell. By rotating the beam about an axis which is displaced from the beam axis tracking of the path and simultaneous control of the torch carriage movement may be afforded over the entire drawing path. In this manner the photocell senser may be utilized to drive the control mechanism and the associated cutting torch in all directions in order to scan and trace the desired path 5 on the drawing. The photocell senser 12 is coupled to the cutting sensor 3 and moves with it over the drawing 14. Since the longitudinal drive is fixed, the sensor 12 need not provide directional control in all directions but only in the transverse direction. Thus it can be a simple photocell arrangement fixedly mounted on the carriage 10.

Control of the path over which the marking device 13 is driven is provided by a drawing 14 upon which is imprinted a guidance path comprising lines 15a and 15b. The path 15a and 15b is drawn essentially in the longitudinal direction and connects each position at which a mark should be placed. On the drawing 14 the path to be followed by the flame cutting torch is repeated in dotted outline in order to show the orientation of the marking lines on the work piece profile.

If the marking lines are to be continuously traced on the finished sheet metal part, the marking tool 13 will comprise a tool for continuously scribing a line on the planned surface of the finished piece. In such applications, a small electric arc which marks the lines 17a and 17b on the work piece may be employed advantageously.

If the markings to be imprinted on the planned surface of the finished piece consist of a number of points distributed at random over the work piece, the plan control drawing 14 is provided with short index lines 15c extending outwardly from the path lines 15a and 15b at each point to be marked. The senser 12 will then scan the control lines 15a and a separate photocell 12a is provided to trip the marking tool 13 (for example, an electromagnetically controlled prick punch) whenever photocell 12a crosses an index line 15c. In such applications, the path line 15a is primarily a guiding line to properly position the operating photocell 12a with relationship to the index 15c. In this manner, marks 17c can be located precisely on the work piece, at the desired locations.

Since the marking sensor comprising photocells 12 and 12a is separated from the cutting path sensor comprising photocell 4 by a longitudinal separation, a concomitant adjustment must be made in the preparation of the control drawings to prevent erroneous indications. To ensure complete scanning, the lines 15a and 15b are extended and connected by line 15d. The line 15a also ensures that photocell 12a is positioned properly on the control drawing to prevent erroneous tripping of the marking tool 13.

Additionally, due to the separation between the sensors, it is necessary to extend the cutting path control drawing 6 by distance indicated by the dimension $x$, so that the control line patterns can be fully traversed during operation.

The drawing provision to ensure traversement over the entire guidance path is best seen by reference to FIGURES 1 and 2 simultaneously. FIGURE 2 is a detail portion of the drawing used for guidance at the starting position thereof.

When the apparatus is started, photocell 12 is positioned to trace starting with the lower starting point of line 15a and photocell 4 is started at the lower starting point of line 5a as is shown in detail in FIGURE 2. As the photocells traverse the guidance path they will move in the direction of arrowheads 18 and 19 with each photocell tracing along the left edge of the drawing line. After completely traversing the guidance path, the cutting control photocell 4 will move in the direction of arrowheads 20 and 21 now on the right-hand side of the starting line, line 5a.

Similarly, photocell 12 will be tracing along the right-hand side of line 15b. In order to provide the necessary carriage movement to provide full scanning of the marking guidance path, line 15a must be at least as long as the distance separating the two photoelectric sensors. That is, distance $x$ must at least equal the distance between photocells 4 and 12. Of course, the cutting torch may be extinguished as soon as it reaches the starting line 5a, since the use thereof is merely for the purpose of providing full traversement of the marking guidance drawing.

In many applications, it is desirable to provide several different marking indicia, dependent upon the operation to be performed at the marker position. Provision for variation of the indicia, such as, for example, by providing round 20, triangular 22, and square 21 marks on a rotatable stamping template 23 may be advantageous. In such applications, it will be necessary to control the template positioning from the control drawing. This may be effected by mounting the marker template on a rotatable turret indexed into the desired position, in accordance with information contained on the control drawing. For this purpose, it is necessary to provide additional information on the drawing which may thus be seen by reference to FIGURE 3.

In FIGURE 3 there is shown the drawing path guidance line 15a with the positioning locations 15c extending perpendicularly thereto. A plurality of code lines 15e are provided before each index line 15c. An additional photocell 12b is provided to scan the code lines 15e and to index the marker turret in response to the number of code lines scanned. In the drawing illustrated, the three code lines actuate the photocell 12b to index the marker turret to the desired indicia which is then imprinted at the desired location as soon as photocell 12a reaches the index line 15c. This arrangement is also applicable to the use of several marking tools carried in the turret arrangement to selectably provide prick punch, electric arc, or paint marks on the finished work.

This invention may be variously modified as embodied in the scope of the subjoined claims.

What is claimed is:

1. Apparatus for simultaneously cutting sheet material and imprinting position indicia thereon which comprises a first plan drawing having the outline profile desired in the finished work marked thereon, a second plan drawing having a guidance path interconnecting each of said indicia positions, a lower carriage movable longitudinally over said drawings, a first steering device mounted for movement along said lower carriage in a direction transverse to said first drawing, said first steerage device being mounted in scanning relationship to said first drawing to track said outline profile, a cutting torch coupled to said first steering device for movement over said sheet in response to longitudinal movement of said carriage and transverse movement of said first steering device, a second steering device movably mounted on said lower carriage for movement transverse to said drawings and a second steering device mounted for movement along said lower carriage in a direction transverse to said first drawings, said second steering device being mounted in scanning relationship to said second plan drawing to track said guidance path, an indicia marking tool coupled to said second steering device for movement over said sheet in response to longitudinal movement of said carriage and transverse movement of said second steering device, and means responsive to each of said indicia on said second drawing to trip said marking tool to mark said sheet.

2. Apparatus in accordance with claim 1 in which said marking tool comprises a plurality of different marking devices and in which said second plan drawing includes coded markings on said drawings adjacent said guidance path and which includes means responsive to said coded markings for selectively indexing the marking devices to mark the sheet with the indicia corresponding to the coded markings.

3. Apparatus in accordance with claim 1 in which that said second steering device comprises a first photoelectric cell to guide the sensor along said path connecting the indicia positions, and a second photoelectric cell responsive to markings at said positions for an actuation of the marking tool.

References Cited in the file of this patent

UNITED STATES PATENTS

| | | |
|---|---|---|
| 1,612,971 | Freeburg | Jan. 4, 1927 |
| 2,261,644 | Cockrell | Nov. 4, 1941 |
| 2,631,028 | Murr | Mar. 10, 1953 |
| 2,832,239 | Bert et al. | Apr. 29, 1958 |
| 2,958,247 | Levine | Nov. 1, 1960 |